July 15, 1969   P. A. DION ET AL   3,455,016
MANUFACTURE OF CLAD WIRE AND THE LIKE
Filed April 26, 1967   2 Sheets-Sheet 2
FIG. 3.
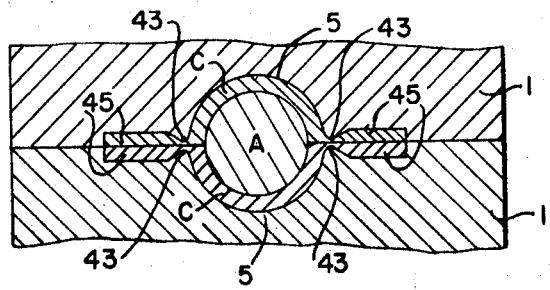
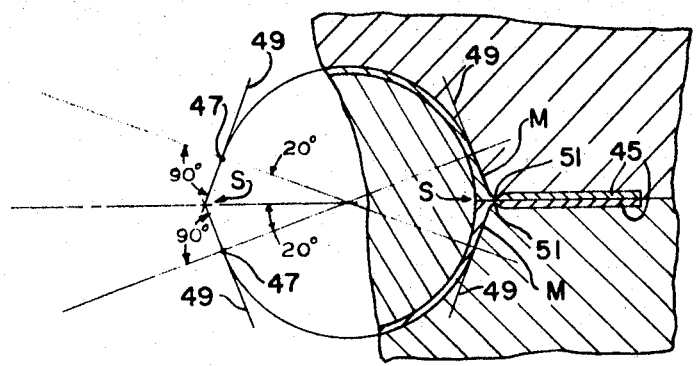
FIG. 4.
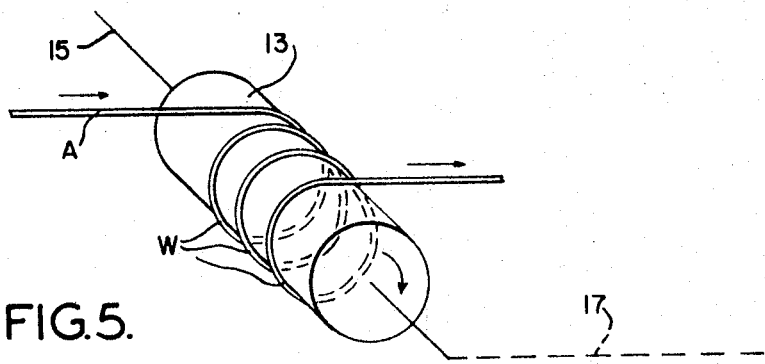
FIG. 5.
Paul A. Dion,
Martin W. Carr.
Inventors
Koenig, Senniger, Powers, and Leavitt,
Attorneys.

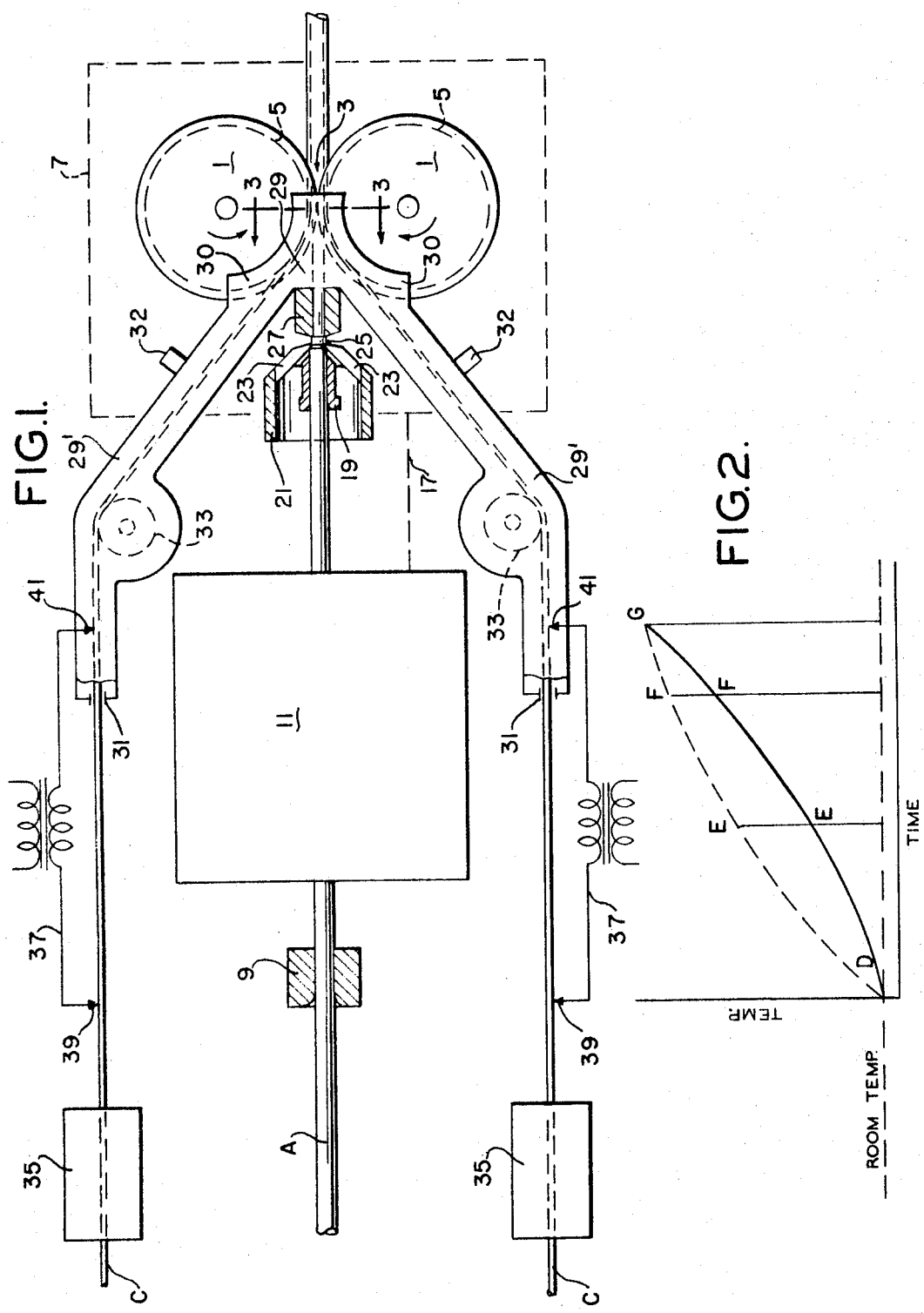

United States Patent Office 3,455,016
Patented July 15, 1969

3,455,016
MANUFACTURE OF CLAD WIRE AND THE LIKE
Paul A. Dion, North Attleboro, and Martin W. Carr, Seekonk, Mass., assignors to Texas Instruments Incorporated, Dallas, Tex., a corporation of Delaware
Filed Apr. 26, 1967, Ser. No. 633,858
Int. Cl. B21b 15/00; B23p 23/04
U.S. Cl. 29—474.1                    12 Claims

ABSTRACT OF THE DISCLOSURE

As-rolled aluminum wire is pulled by a capstan through a lubricated draw die with a 5% to 30% reduction in cross-sectional area, to eliminate the usual flats thereon. From the capstan the wire is pulled by forming rolls through apparatus for preparing its surface for solid-phase bonding with two copper cladding strips. The solid-phase bonding is accomplished under compression by the rolls, which form and squeeze the copper strips around the aluminum wire. Entry between the rolls occur through a plenum chamber containing a reducing atmosphere. For surface preparation the apparatus is constructed so that contaminating lubricant on the wire is prevented from entering the plenum chamber. Each of the copper strips is first guided through precleaning apparatus for removing gross contaminants. Each is engaged by spaced electrical contacts for resistance-heating. Part of the heating occurs in air, with increasing temperature to drive off water, gasses and organic and inorganic compounds, which results in oxidation of the strip. Resistance-heating continues at higher temperatures under a reducing atmosphere in the plenum chamber to eliminate the oxide.

When the aluminum wire and the strips enter the rolls from the plenum chamber, heat flows from the copper strips mostly to the aluminum core and some to the rolls. This rapidly brings the aluminum-copper composite to equilibrium temperature as the composite is being bonded by reduction in the solid phase. Roll geometry copper thickness and aluminum diameter is such as to produce clad composites in the usually demanded three percentages of copper by volume, i.e., 10%, 15% and 20%.

The field of the invention is manufacture of clad wire and the like as exemplified in U.S. Patents 3,220,106 and 3,220,107. Various individual arrangements for resistance-heating of cladding strips, and for removing contaminated surfaces of wires and strips, are shown and claimed in the following U.S. patent applications: Ser. No. 518,-821, filed Jan. 5, 1966 by Paul A. Dion, for Metal Cladding, issued as Patent No. 3,408,727; Ser. No. 591,752, filed Nov. 3, 1966 by Arthur J. Thomson, for Manufacture of Clad Wire and the Like; and Ser. No. 607,254, filed Jan. 4, 1967 by Paul A. Dion and Arthur J. Thomson, for Manufacture of Clad Wire and the Like.

The present invention solves a number of problems which have arisen in employing constructions such as referred to above in cladding copper strips on an aluminum core. Thus it provides for bonding copper strips to aluminum core wire under conditions appropriate for various volume percentages of copper to aluminum in clad composites, so as to obtain in all cases at maximum speed copper-clad aluminum wire of uniform strength, finish and accuracy throughout its length.

FIG. 1 is a schematic view illustrating the invention;
FIG. 2 is a chart plotting time against temperature, the location of the chart being correlated to FIG. 1 so as to indicate temperature rise in moving strip material which is being resistance-heated;
FIG. 3 is an enlarged fragmentary cross section taken on line 3—3 of FIG. 1, and illustrating certain groove sections;
FIG. 4 is a further enlarged but fragmentary view similar to FIG. 3, illustrating alternative groove sections; and
FIG. 5 is an isometric view illustrating a form of capstan employed in carrying out the invention.

Corresponding reference characters indicate corresponding parts throughout the several views of the drawings. The drawings, being schematic, are not to scale. The term wire as used herein shall be understood to encompass rods, tubes and the like.

Referring to FIG. 1, numerals 1 indicate a pair of driven compression rolls arranged tangently at a nip space 3 between them. The rolls 1 form part of a conventional rolling mill shown by the dotted line 7. The form of the nip space is provided by grooves 5 in the rolls. Advantageous forms of the grooves will be described below.

At A is shown an aluminum wire and at C are shown copper strips of widths sufficient to provide for being formed around the wire A so as to clad the same with copper. The wire A and strips C are pulled from the usual supply packages, as for example, from coils of the same (not shown). The aluminum wire A is shown as it comes from the factory, being in the as-rolled commercial form which has flats (usually three) along its length which need to be removed. This is accomplished by pulling the wire A through a circular drawing die 9 which eliminates the flats and produces a reduction in cross-sectional area in the range of about 5%–30%. A succession of dies may be employed to achieve greater deductions. The die is lubricated to effect smooth drawing action and therefore the surface of the wire is contaminated with lubricant as it leaves the die, in addition to the usual contaminants that its surface carries.

From the die 9 the wire A passes to pulling apparatus 11, the basic element of which, as shown in FIG. 5, is a pulling and snubbing capstan cylinder 13, mounted on a shaft 15. The shaft 15 and rolls 1 are synchonously driven in the directions shown by the curved darts. This is symbolized by line 17. The wire A is wrapped around the cylinder 13 with a suitable number of turns to provide sufficient pulling and snubbing action in a manner to be described. The diameter of the cylinder is large enough to prevent kinking of the wire in its passage around the cylinder.

From the cylinder 13 the wire A passes through a guide sleeve 19. Rotatable around the sleeve 19 is the head 21 of a so-called hollow milling cutter. The drive for rotating this cutter is not shown, being known. However, details of certain particular forms are claimed in said applications Ser. Nos. 591,752 and 607,254. The head 21 carries a plurality of cutting tools 23 which under rotation cut away the usually heavily contaminated surface of the wire A. As a result, the diameter is reduced as indicated at 25 where a comparatively clean new surface is indicated. However, there exists an oily atmosphere around the reduced portion 25 which somewhat recontaminates the clean surface with oil. Therefore a nonrotary circular shaving die 27 is provided. This axially shaves away the recontaminated surface with some further slight reduction in the diameter of the wire. Thus as the shaving die 27 is entered, the wire of reduced diameter has a virgin aluminum surface. The inside cylindrical surface of this die 27 fairly closely fits the shaved diameter of the wire A. The seal afforded between the circular cutting edge of the die 27 and wire A prevents any contaminating oily atmosphere from reaching the cleanly shaved surface as it advances toward the rolls 1. The die 27 is mounted on a plenum chamber 29 having appropriate running seals about the sides and peripheries of the rolls 1. Thus the die forms a sealed moving-wire inlet for the chamber 29.

The plenum chamber 29 also has extending inlet portions 29' for reception of the copper strips C. The strips enter through inlets 31. Connections 32 are for the introduction of a reducing atmosphere into the chamber 29, 29'. In the extensions 29' are rolls 33 for guiding the strips through the plenum chamber to the nip space 3. It will be understood that the extents and the forms of the inlet extensions 29' of the plenum chamber may be varied so as to lengthen or shorten the extent of the strips in them. In the form shown, there is a considerable distance between the inlets 31 and the nip space 3 but this distance may be made much shorter if desired.

Each of the copper strips C first passes through cleaning apparatus 35. While the cleaning may take place "in line" with the following operations, alternatively, the cleaning may be done in a separate operation. The cleaning includes degreasing and removal of gross contaminants as by pumice-scrubbing, vapor blasting or the like, and rinsing. Thereafter their surfaces are kept as free as possible of oil. The strips C then pass through the inlets 31 of the plenum chamber 29, 29'. The strips are heated, for example, by resistance-heating from electrical circuitry 37, the current being applied at slip contacts such as 39 and 41. Part of the length of each moving strip which carries the heating current is outside of its inlet 31 and part is inside of the inlet within the plenum chamber 29, 29'. Thus the heating process occurs about as shown by the chart of FIG. 2. The ordinates of this chart indicate temperature and the abscissas indicate the time required for a point on a strip C to move between the points 39 and 41 of current application. Alternatively, current application point 41 may be at idler roll 33 or nip space 3. The lower solid curve of the chart indicates increase in temperature at higher speeds of the strip C while the upper dotted curve indicates the increase in temperature at lower speeds of the strip C. Appropriate speeds are from 46 f.p.m. to 100 f.p.m. Between the points D and E on either curve, volatiles such as water and gases are driven off. Between the points E and F, organic and inorganic compounds become burned off. As a result of being heated in the air, the strips become oxidized. The temperature increases between points F and G but this occurs after the strips have entered the reducing atmosphere within the plenum chamber 29, 29'. The maximum temperature at G may be controlled at given wire and strip speeds by controlling the current delivered by the circuits 37. A temperature in the range of 1000° F.–1250° F. is satisfactory. The atmosphere may be hydrogen or a gas-containing hydrogen. The result is that between points F and G the copper oxides are reduced to copper and water, the latter being driven off. This leaves the surfaces of the strips C substantially free of any bond-deterrent films.

With the elongate extensions 29' of the plenum chamber 29 there is some cooling of the strips from their maximum temperatures reached at G. Such cooling may be desirable to allow the temperature at G to be higher in the given range in cases of stubborn contamination to be removed, after which the cooling allows the optimum temperature to be had as the wire enters the nip space 3. However, the provision for cooling may not always be required, in which event the plenum chamber is constructed to minimize the length of travel therein prior to the strips reaching the nip space 3. Of course no cooling occurs where current application point 41 is at nip space 3.

The temperature of each strip at the time that it reaches the nip space 3 should be such as to take into account that the wire A will be at a moderate temperature caused by the cutting actions of the milling cutters 23 and the shave die 27. This temperature will ordinarily be on the order of 150° F. As the wire passes into the nip space 3, it becomes sandwiched between the strips C. The strips are formed and squeezed around the wire within the grooves 5, as indicated in FIG. 3, for example. The grooves 5 are terminated by lands 43 which have about .004 to .008 inch clearance. Compression in the nip space 3 brings about some reduction in the cross section of the resulting composite with solid-phase bonding between the strips and the core and between the margins of the strips at the pinch regions between the lands 43. The scrap 45 is ultimately conventionally removed to finish the clad wire.

Since the rolls 1 and the wire A are at considerably lower temperatures in the nip space 3 than the temperatures of the entering strips C, the rolls and core will act as heat sinks and very rapidly bring the whole aluminum-copper composite in the nip space 3 to an equilibrium temperature for solid-phase bonding. The preferred temperature of the bonded wire as it leaves the nip space 3 is between approximately 450° F.–550° F., depending upon the ingoing temperatures of the wire A and of the copper strips C. Higher bonding speeds in the nip space 3 result in the higher equilibrium temperatures in the 450° F.–550° F. range, because under such higher speeds the time of heat-abstracting action by the rolls is minimized.

The cylindrical capstan 13 is employed to protect the composite in the nip space 3 from application thereto of the inherently large and variable back tension on wire A caused by the forces required to withdraw it from its supply and pull it through the forming die 9. This back tension may vary in the range of 1000–2500 lbs. Such large and variable back tension, if applied to the composite in the nip space 3, would result in nonuniform quality along the length of the finished composite. Reasons for this appear below. Thus this back tension should not reach the composite in space 3. To avoid this, the wire A is wrapped with an appropriate number of turns as at W around the capstan 13 (see FIG. 5). Thus the capstan acts as a snubber for reducing this large variable back tension. The surface speed of the capstan 13 is designed to be slightly greater than the surface speed of the rolls 1 at contact with the composite in the nip space 3. When the wrap W is tight, there is little or no slip between it and the cylinder 13. Slip occurs when the wrap is loose. Under tight-wrap conditions of substantially no slip, the capstan 13 takes in and pays out wire at a rate greater than the rate at which it is drawn in by the rolls 1. Therefore the wrap W is loosened, whereupon slip sets in. Then the cylinder 13 draws in and pays out wire at a rate less than the rate at which the rolls 1 draw it in. This again tightens the wrap and the cycle repeats. The variable back tension between the shave die 27 and the capstan 13 is comparatively small, being only the amount required to tighten the wrap W on the capstan 13. This is much smaller than the back tension between the capstan and the drawing die 9. The variation in this smaller tension, instead of being on the order of the above-mentioned 1000–2500 lbs., which otherwise would be transmitted to the nip space 3, is reduced to something on the order of 10–100 lbs. To arrive at the total back tension on the composite in the nip space 3, there must be added to the back tension between the shave die 27 and the capstan 13 that between the die 27 and the space 3. This addition, however, is comparatively uniform.

As stated above, it is of importance that the back tension on the composite in the space 3 be minimized as much as possible and that more importantly its variations shall be as small as possible in order to obtain uniform bonding characteristics along the length of the bonded composite as it issues from the rolls 1. Excessive back tension tends to starve the sides of the composite between rolls 1, resulting in weak lateral bonds at the edge portions of the cladding strips.

Copper-clad aluminum wire as presently provided for the trade is produced in three percentages of copper by volume, i.e., 10%, 15% and 20%. The lower the percentage of the copper, the thinner will be the ingoing strips used according to the invention. The higher percentages produce fewer problems in the nip space 3 but with the necessary reduction for good bonding and thinner starting strips, the strips may tend to become so thin as to impair the bonds at the lands 43. This is caused by a tendency to pinch and score the thin edges of the thin strips where they are being bonded by the corner portions of the semicircular toroidal grooves in the rolls at their lands. Thus while such scoring is comparatively harmless in the cases of the greater percentages of copper by volume (see FIG. 3), we have found that it damages the edges of thin strips and steps must be taken to avoid the condition when the smaller percentages of copper by volume are used. In view of the above, it will be seen that the semicircular cross-sectional outlines of the grooves 5 for the greater copper percentages may be as shown in FIG. 3 but should be modified as shown in FIG. 4 for smaller copper percentages. To this end, points 47 are established at 20° from the horizontal on the semicircular groove sections. Through these, tangents 49 are established for determining beveled outwardly diverging margins M of the groove forms adjacent to the circular lands 51. The result is relief in this region against damaging scoring actions on the margins on thinner copper strips. Such outwardly diverging groove margins differ from those of FIG. 3 wherein they do not diverge.

The beveled margins M also supply extra space at the regions S, which will not become overfilled with aluminum upon squeezing at the margins of the strips. Overfilling is a term which means that under compression and flow of the aluminum it will become squeezed out between the strips at the roll lands and the result is an inferior clad wire.

Underfilling of the marginal spaces within the roll lands is another problem which occurs in respect to both forms of the roll grooves shown in FIGS. 3 and 4 for both thick and thin cladding. It is caused by excessive back tension tending to neck down the aluminum wire in the roll nip as the composite is being bonded. Again the result is an inferior clad wire. The use of the capstan 13 prevents such underfilling.

The following table shows that the partially round and bevel-grooved rolls as shown in FIG. 4 also admit of a higher permissible reduction of the composite in the roll nip.

APPROXIMATE PERMISSIBLE REDUCTION PERCENTS AT BONDING

| Copper volume, percent | With round-grooved rolls | With bevel-grooved rolls |
| --- | --- | --- |
| 10 | 8 | 11 |
| 15 | 11 | 14 |
| 20 | 15 | 18 |

It may be mentioned that the reduction referred to as occurring in the nip space 3 is expressed as a percent change of the cross-sectional area of the composite therein according to the equation $$\frac{A_O - A_F}{A_O} \times 100 = \text{percent reduction in area}$$

where:

$A_F$ = As-bonded cross-sectional area
$A_O$ = The area calculated on the basis of a diameter equal to that of the input rod plus twice the ingoing strip thicknesses In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Apparatus for manufacturing metal wire or the like having a clad core, comprising:
   a drawing die for the core,
   a capstan around which the core is wrapped for pulling the core through said die,
   draw rolls having grooves for pulling the core from the capstan at a pulling speed less than that of the surface speed of the capstan whereby back tension on the core at the draw rolls is reduced, said draw rolls simultaneously pulling the strips of cladding from preliminary cleaning apparatus, said rolls having a nip space between them for forming the strips around the core and solid-phase bonding them by reduction under pressure.

2. Apparatus according to claim 1, including a plenum chamber connected with said nip space, said chamber containing a reducing atmosphere, said plenum chamber having a first inlet for the core and two additional inlets for the strips respectively, said first inlet being formed by a core-surface shaving die for the wire moving from the capstan to the nip space, said shaving die at its shaving edge sealing said first inlet against entry into the plenum chamber of contaminants carried on the core before shaving.

3. Apparatus according to claim 2, including rotary milling cutters between the capstan and the shaving die for cutting away the core surface in its approach to the shaving die.

4. Apparatus for the manufacture of wire or the like composed of a clad core, comprising:
   a drawing die,
   a capstan for pulling core material through said die to draw the core to circular shape,
   grooved draw rolls for simultaneously pulling drawn wire from the capstan and strips of metal from preliminary apparatus, said rolls having a nip space between them for forming the strips around the wire and solid-phase bonding them into a composite by reduction under pressure, said capstan reducing application to said composite as it is being formed of back tension caused by said die,
   an inlet plenum chamber connected with said nip space, said chamber containing a reducing atmosphere, said plenum chamber having a first inlet for the aluminum wire and two additional inlets for the metal strips respectively, said first inlet being formed by a circular shaving die for receiving and shaving the aluminum core moving from the capstan to the nip space,
   rotary milling cutters between the capstan and the shaving die for cutting away the contaminated surface material from around the core in its approach to the shaving die,
   electrical means for resistance-heating of each strip both in its approach to and for some distance within the plenum chamber,
   said resistance-heating in said approach driving from the strips water, gases, organic and inorganic compounds while oxidizing the strip, the heating within the plenum chamber removing the resulting oxide.

5. Apparatus according to claim 4, wherein the margins of each of the grooves are in the form of outwardly diverging beveled portions.

6. Apparatus for manufacturing wire or the like composed of copper-clad aluminum core, comprising:
   a drawing die for an aluminum core,
   a capstan for pulling the aluminum core through said die to draw the core to circular shape,
   grooved draw rolls for simultaneously pulling the drawn aluminum core from the capstan and strips of copper from surface preparation apparatus, said rolls having a nip space between them for forming the copper strips around the aluminum core and solid-phase bonding them into a composite by reduction under pressure, an inlet plenum chamber connected with said nip space, said chamber containing an atmosphere for reducing copper oxide, said plenum chamber having a first inlet for the aluminum core and two additional inlets for the copper strips respectively, said first inlet being formed by a circular shaving die for receiving and shaving the aluminum core moving from the capstan to the nip space, rotary milling cutters between the capstan and the shaving die for cutting away the contaminated aluminum surface material of the core in its approach to the shaving die, said cutters and shaving die moderately heating the aluminum core to a temperature on the order of 150° F., electrical means for resistance-heating of each copper strip both in its approach to and for some distance within the plenum chamber, said resistance-heating in said approach to the chamber driving from the copper strips water, gases, organic and inorganic compounds while oxidizing the strip, the heating within the plenum chamber being at a temperature in the range of 1000° F.–1250° F., said composite as it is being formed in the nip space having an equilibrium temperature of its core and cladding portions in the range of 450° F.–550° F.

7. Apparatus according to claim 6, wherein the margins of each of the grooves are in the form of outwardly diverging beveled portions.

8. Apparatus according to claim 6, wherein the plenum chamber is formed to provide a comparatively short passage of the aluminum core from the shaving die to said nip space and to provide comparatively long passages for the copper strips from their resistance-heated portions to said nip space.

9. The process of making copper-clad aluminum wire comprising moving copper strips from a supply through a plenum chamber containing a reducing atmosphere and into the nip space between grooved draw and compression rolls, said chamber confining said atmosphere at said nip space, increasingly heating said moving strips before and after they enter the plenum chamber to burn off volatile contaminants before entry and after entry to remove oxides therefrom, moving a length of aluminum core material through a rotating hollow mill having cutters moving circularly around the core material, and thereafter moving the core material through a concentric circular shaving die axially operative in respect to the moving core material, said mill and die operating to clean the core material by each of them removing surface material from the core, said shaving die operating to seal the plenum chamber against entry of contaminants from the cutters, and after the core has been thus cleaned moving it through the reducing atmosphere in said chamber and then into position between said cleaned strips in said space for compression to form a solid-phase bond, free of oxides and other contaminants between the strips and the core material.

10. The process according to claim 9, including the step of initially passing the core through a drawing die and then through snubbing means between the drawing die ad the shaving die to reduce variations in back tension in the core material as it approaches the shaving die substantially to reduce variations in the core diameter.

11. The process of metal-cladding a wire comprising guiding the wire to forming means for removing surface irregularities and then to a nip space, pulling the wire through said forming means and into and through said nip space, removing contamination from the wire by circularly cutting away its surface at a region between the wire forming means and the nip space to provide a substantially virgin surface, pulling clean metal cladding strips into and through said nip space on opposite sides of the wire, squeezing together the wire and strips while in said nip space to solid-phase bond them by reduction to form a clad composite, and continuously snubbing the wire during its movement from said forming means to said cutting region, thereby restricting any substantial and variable tension in the wire to a part of its moving from the forming means to said region of circular cutting.

12. The process according to claim 11, including heating the cladding strips at an oxidizing temperature in their initial approaches to the nip space to remove contaminants, and maintaining an oxide-reducing atmosphere around the cladding strips and the wire in the region of their final approaches to the nip space both to remove the oxidation from the strips and to surround the substantially virgin surface of the core wire.

References Cited

UNITED STATES PATENTS

| | | | |
|---|---|---|---|
| 2,414,511 | 1/1947 | Dyar | 228—18 |
| 3,372,465 | 3/1968 | Frisling | 29—474.1 |
| 3,220,106 | 11/1965 | Clark | 29—473.9 |
| 3,220,107 | 11/1965 | Clark | 29—474.1 |

RICHARD H. EANES, JR., Primary Examiner

U.S. Cl. X.R.

29—33; 228—18